G. HARLOW.
REACTANCE COIL.
APPLICATION FILED JUNE 20, 1916.

1,389,193.

Patented Aug. 30, 1921.

WITNESSES:
A. J. Fitzgerald.
Geo. W. Hansen

INVENTOR
George Harlow.
BY
Wesley Carr
ATTORNEY

UNITED STATES PATENT OFFICE.

GEORGE HARLOW, OF ALTRINCHAM, ENGLAND, ASSIGNOR TO WESTINGHOUSE ELECTRIC AND MANUFACTURING COMPANY, A CORPORATION OF PENNSYLVANIA.

REACTANCE-COIL.

1,389,193.

Specification of Letters Patent.   Patented Aug. 30, 1921.

Application filed June 20, 1916.   Serial No. 104,793.

*To all whom it may concern:*

Be it known that I, GEORGE HARLOW, a subject of the King of Great Britain, and a resident of Woodgarth, Oldfield Road, Altrincham, in the county of Chester, England, have invented a new and useful Improvement in Reactance-Coils, of which the following is a specification.

My invention relates to inductive reactance coils and especially to power-limiting reactance coils which are utilized to limit the current-flow in an electrical circuit on the occurrence of a short-circuit or any other condition that is manifested by an abnormally high current flow in the circuit.

One object of my invention is to provide a reactance coil or power-limiting device which, under normal conditions, will insert either a negligible, or a substantially small amount of, inductive reactance in the circuit but which will automatically insert a very large reactance therein when an excessive flow of current takes place.

Figure 1:
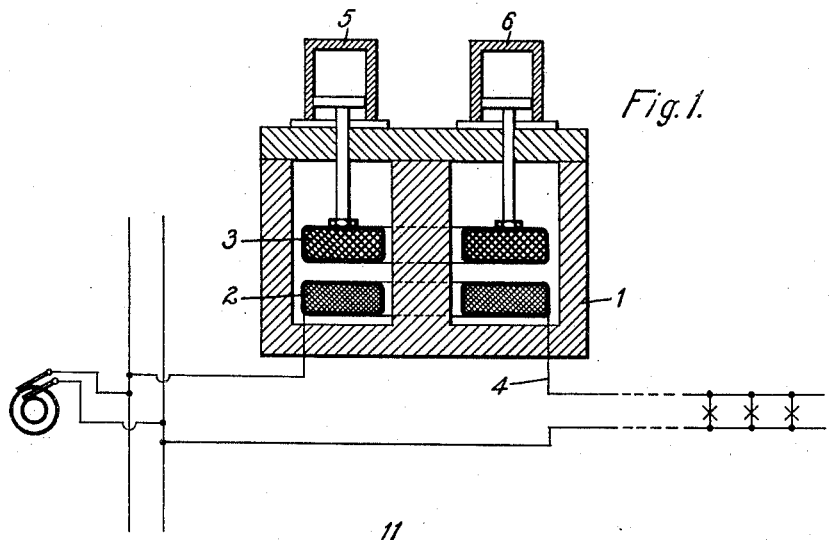
Figure 2:
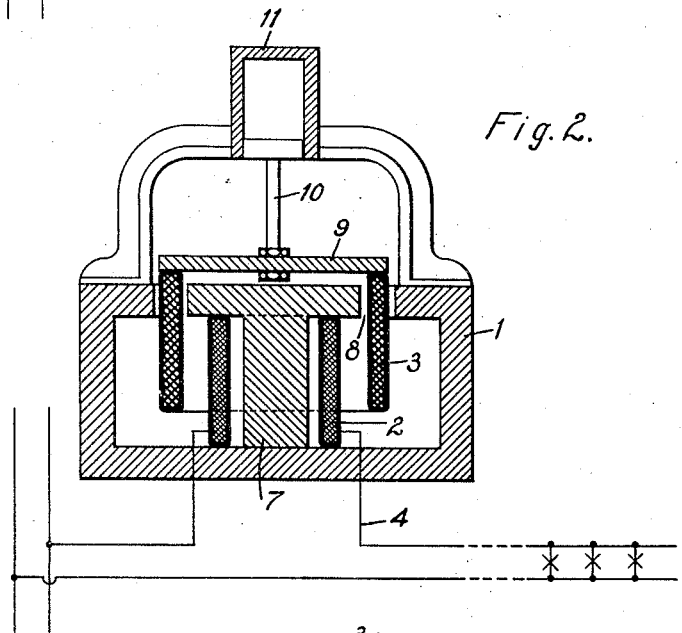
Figure 3:
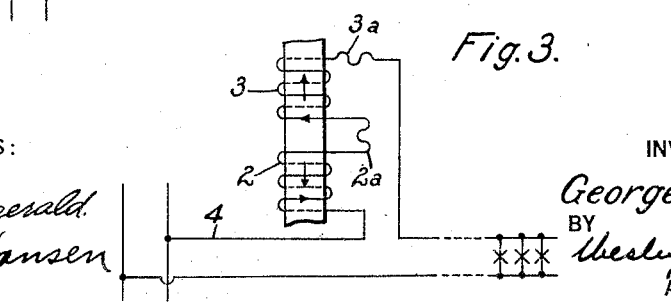

For a better understanding of the nature and scope of my invention, reference may be had to the following description and the accompanying drawing in which Figure 1 is a diagrammatic representation of a power circuit equipped with a power-limiting device embodying one form of my invention; Fig. 2 is a diagrammatic view of a power circuit in which the current flow in a feeder circuit is limited by a reactance coil constructed in accordance with my invention, and Fig. 3 is a diagram showing a modified form of the reactance coils of Figs. 1 and 2.

My power-limiting device comprises two magnetically linked co-axial coil-windings, at least one of which is connected in series with the feeder or other electric circuit which it is desired to protect, and the other coil, under normal conditions, is closely mutually inductively related therewith. Provision, however, is made for relative movement between the two coils. By this arrangement, the inductive reactance inserted in the circuit under normal conditions by my power-limiting reactance device is negligible or very small, but, when an excessive current passes through one of the coils, the mutual repulsion between the coils causes them to separate, which action introduces a very large reactance in the circuit in which the abnormally high current flows. When the current flow in the circuit is reduced to a normal value, the two coils are again automatically brought into close mutual inductive relation, thereby relieving the circuit of the abnormally high reactance that was temporarily inserted only for limiting the current flow therein to a safe value.

Referring to Fig. 1, a core 1 which resembles, in some respects, the core of a shell-type transformer is provided with two coils 2 and 3, the space for receiving said coils being made sufficiently large to permit of the desired movement between the coils. The coil 2, which may be designated as the primary coil, is connected in series with a feeder conductor 4 in which it is desired to limit the current flow that may be occasioned when a short circuit occurs in the feeder circuit. The coil 3, shown as the movable coil, is directly superimposed upon the coil 2. Moreover, the coil 3 is closed upon itself, the dash pots 5 and 6 being provided for restraining sudden movements of the closed circuit coil 3 when abnormally large currents are induced therein. Under normal conditions, the coil 3 is in close contact with the coil 2 by reason of the action of gravity upon it. In this position, the coils 2 and 3 are in close inductive relation and, therefore, the reactance inserted in the feeder 4, through the intermediary of the coil 2, is substantially low or negligible. When a short circuit occurs upon the feeder 4, however, the very large current flow through the coil 2 will induce a correspondingly large current in the closed-circuit secondary coil 3. This simultaneous and increased current flow in both coils 2 and 3 will effect a repelling action between the coils wherefore the coil 3 will move upwardly, the suddenness of movement thereof being restrained by the dash pots 5 and 6. The coil 2 will therefore act as a substantially pure inductance and limit the current flow in the feeder 4 to a safe value. When normal conditions are restored on the feeder, the coil 3 will drop and automatically remove the high reactance inserted in the circuit by reason of the action of the coil 2.

It is obvious, of course, that the primary coil 2 may be made movable in place of the secondary coil 3, but, in the arrangement shown, movable contacts are dispensed with which is an advantage, particularly in circuits adapted to transmit large quantities of power.

In Fig. 2, the primary coil 2 is wound in tubular form and embraces a central core leg 7 of the core member 1. The upper yoke of the core 1 is provided with spaced air gaps 8 which permit the secondary winding 3 to partially surround the primary winding 2. A cross piece 9 is secured to the coil 3 and at its center is supported a piston member 10 which is adapted to coöperate with a cylinder member 11 of a dash pot. Under normal conditions, the coils 2 and 3 are in close inductive relation, wherefore the reactance introduced in the feeder circuit 4 is substantially negligible. When a short circuit occurs in the feeder circuit, however, the coils 2 and 3 will separate, in this instance the coil 3 being repelled upwardly, whereby the primary coil 2 will act as an inductive reactance device to limit the value of the current flow.

In Figs. 1 and 2, the secondary coils 3 are shown as closed-circuit coils, but it is obvious that the movable coil may be electrically connected in circuit with the stationary coil, as shown in Fig. 3. In this instance, the coils 2 and 3 are connected in series with, and in opposition to, each other. Under normal conditions, the movable coil 3 is in close magnetic relationship to the coil 2, as hereinbefore explained. When a short circuit occurs upon the feeder 4, an abnormally high current will simultaneously flow through the coils 2 and 3 which will cause the coil 3 to be repelled upwardly from the coil 2, the action being permitted by the flexible leads 2ᵃ and 3ᵃ. The reactance inserted in the feeder circuit by the coil 2 and also the coil 3, under this condition, will limit the current flow in the circuit to a safe value.

As set forth in the foregoing description, my invention is utilized as a power-limiting device, but it is apparent that a reactance coil of my invention may be used for adjusting the potential drop in a feeder, when desired. In certain cases, where there are two or more feeders between two points and one feeder is shorter than the other, the shorter feeder tends to take the greater part of the load, and, in consequence thereof, may become overheated. By inserting a device constructed in accordance with my invention in the shorter feeder, the load may be equally divided between both feeders, since the choke coil will compensate for the reactance drop which the short feeder is lacking. When serving in this capacity, the choke coil is preferably made so that its reactance may be adjusted by altering the relative position of the coils 2 and 3 by hand. After the minimum distance between the coils has thus been adjusted, further movement between them is caused, as hereinbefore described, by an abnormal current flow through the feeder.

While I have shown and described several embodiments of my invention, it will be understood that many modifications may be made therein without departing from the spirit and scope of the appended claims.

I claim as my invention:

1. A reactive protective device for an electrical circuit comprising two relatively movable coils, one of said coils being adapted for connection in the electrical circuit and the other coil being closed upon itself, a magnetic circuit therefor, means for retarding the movement of one of the coils when an increased mutual repulsion between the coils results from abnormal current conditions obtaining in the associated electrical circuit.

2. A reactance device comprising two concentric coils, one movable and one fixed, a core member surrounding and being partially surrounded by said coils, and dash-pot means for retarding the movement of the movable coil when an increased repulsion exists between said coils, the axes of the coils, the core, and said retarding means being coincident.

3. A reactive protective device comprising a core member having a centrally disposed leg member of substantially T-shape and two symmetrically disposed side leg members, a coil fixedly mounted on said central leg member and a coil of tubular shape mounted so as to move between said T-shape leg and the side leg members, said movable coil being normally disposed so as to surround said stationary coil.

4. A reactance device comprising a core member having a centrally disposed leg member of substantially T-shape and two symmetrically disposed side leg members, a coil fixedly mounted on said central leg member, and a coil of tubular shape mounted so as to move between said T-shape leg and the side leg members, said movable coil being normally disposed so as to surround said stationary coil, and a dash pot disposed in alinement with said coils and connected to said movable coil for retarding any movement thereof.

In testimony whereof, I have hereunto subscribed my name this nineteenth day of May, 1916.

GEORGE HARLOW.

Witnesses:
W. S. TOPLIS,
E. JACKSON.